United States Patent Office 3,701,676
Patented Oct. 31, 1972

3,701,676
PROCESS FOR IMPREGNATING AND SEALING CAST METAL SURFACES
Erich Bader, Hanau am Main, Karl G. Kannenberg, Grossauheim, and Hans-Benno Ricke, Kirchheim, Germany, assignors to Deutsche Gold- und Silber-Scheideanstalt vormals Roessler, Frankfurt am Main, and Buttner-Schilde-Haas AG, Krefeld, Germany
No Drawing. Filed May 20, 1970, Ser. No. 39,146
Claims priority, application Germany, May 22, 1969, P 19 26 126.8
Int. Cl. B44d 1/34
U.S. Cl. 117—49                                3 Claims

ABSTRACT OF THE DISCLOSURE

The surfaces of cast metal articles are impregnated and/or sealed by introducing into the pores of the metal a liquid polymerizable ester of methacrylic acid or acrylic acid or a mixture of both with at least one polyhydric alcohol whereupon the ester is cured in the absence of a polymerization catalyst. The application of the ester is effected upon application of pressure or of a vacuum or by applying, successively, both pressure and a vacuum. The polymerization is effected within the pores of the metal to improve the impermeability of the metal.

BACKGROUND OF THE INVENTION

Pores of metal articles have already been sealed and their impermeability has been improved by introducing a sealing compound into the pores and curing the compound within the pores by application of elevated temperatures with or without use of catalysts.

When the curing is complete a corresponding portion of the pores and other permeable parts of the metal surfaces is closed up by the sealing agent. The impermeability of the metal against liquids and gases is thus increased.

The application of the sealing agent can be effected by a partial vacuum or pressure or alternate application of both. For instance the portions to be treated may first be subjected to a cleansing for instance by means of a solvent. After removal of the solvent the articles are then placed into a vacuum chamber for instance a tank and the latter is then evacuated. The next step is to introduce the sealing or impregnating compound into the chamber until the articles are completely covered by the liquid. Thus the sealing compound enters the pores and other surface openings. After completion of the impregnating process the surface portions are cleansed by rinsing and the curing is effected.

The impregnating compounds used in this process heretofore were drying oils, synthetic resins and styrene in solution together with unsaturated fatty acids. Since the hardening of the impregnating compound involves evaporation thereof, a complete sealing could not thus be obtained. The use of mixtures of styrenes and polyesters likewise was not completely successful since they have a very brief pot life and because furthermore the excess amounts in view of their high viscosity can only be removed from the surface by the use of solvents. These solvents however effect removal by solution again of part of the resin which has been introduced into the pores. The impregnating effect is thus impaired.

There have also been used for this purpose mixtures of low viscosity which for instance consisted of an unsaturated polyester and a polymerizable monomeric compound containing a $CH_2=CH$ group. These mixtures were cured by thermic action or catalytically or a combination of both means; see U.S. Pat. 2,772,185.

An additional shortcoming of this process was the fact that the viscosity of the material which is between 100 and 3000 cp. and depends on the contents of polymers or degrees of polymerization of the polyester interferes with a perfect impregnation particularly where only small apertures in the surface are involved. In practical application this results in a fairly substantial amount of rejects.

Undesirable is furthermore the comparatively high vapor pressure of the monomers because it results in evaporation losses during the impregnation and curing.

There are furthermore necessary laborious safety requirements since the monomers used in these cases are toxic and have a low flame point.

A further shortcoming is the fact that because of the high vapor pressure a two-stage process is necessary to apply the impregnating compound. In the first stage the metal parts are subjected to a comparatively high vacuum which has to be done at a temperature of the environment at which the monomers would already be subject to boiling. In the second stage the evacuated parts are then impregnated.

It is also a disadvantage that an emulsifying agent must be included in the polyester in order to be able later to rinse the impregnating resin which adheres to the exterior of the surface with water.

It is therefore an object of the invention to provide for an impregnation treatment for cast metal surfaces which improves their impermeability and on the other hand avoids the shortcomings above-described.

SUMMARY OF THE INVENTION

The invention resides in the fact that as the polymerizable composition there is used a polymerizable liquid monomeric ester of a methacrylic acid or acrylic acid or a mixture of both with at least one polyhydric alcohol and that this polymerizable ester is then cured within the pores of the metal to which it has been applied by pressure or in a vacuum or successively under pressure and in a partial vacuum by curing it in the absence of a polymerization catalyst.

DESCRIPTION OF THE PREFERRED EMBODIMENTS

In practical application the invention can be carried out by dipping the articles to be treated directly into the liquid ester of the methacrylic acid, acrylic acid or mixture of both and causing the penetration of the pores or other surface openings by means of a vacuum or pressure. It is also possible to combine both steps, that is a vacuum and pressure may be applied successively or in repeated alternating sequence.

The articles to be treated can however also be introduced in a vacuum chamber, the chamber can then be evacuated and the liquid ester of the methacrylic acid or acrylic acid or both can then be introduced into the chamber. After the chamber has been filled up the articles are cleansed at their surface of monomers which for instance can be carried out by simple rinsing with water while applying an exterior emulsifying agent. The rinsed particles are then subjected to an elevated temperature which should be between about 70 and 180° C. so that the monomers are cured in the cavities of the articles.

The thus-obtained products are distinguished by a high impermeability in spite of the comparatively simple process.

The process can be used with all porous metals, particularly aluminum casts, magnesium casts and pressure casts. The process may also be used for conventional alloys of these two metals to which other metals as customary have been added, for instance materials made of "Duralumin" (Al-Cu-Mg), "Silumin" (Si-Mg) or also metal bronze articles.

The preferred ester of the methacrylic acid is the triethyleneglycol-dimethacrylate. Other examples are diethyleneglycol-dimethacrylate, monoethyleneglycol - dimethacrylate, neopentylglycol-dimethacrylate, butanediol - dimethacrylate, pentaerythrite-tetramethacrylate, further the corresponding acrylates, such as tetramethylenediacrylate and ethylenediacrylate, and mixtures thereof.

Since the process is carried out in the absence of a polymerization catalyst the monomers will have a long storage life. It is thus possible to effect the treatment in large areas, for instance in boilers where simultaneously different portions or surfaces have to be treated. The storage properties can further be improved by adding small amounts of a conventional inhibitor to the monomeric esters of the methacrylic acid or acrylic acid. Examples are for instance quinone, hydroquinone, tert. butylcatechol and other conventional phenolic inhibitors.

The following examples will further illustrate the invention.

Example 1

A magnesium pressure cast part was cleansed of impurities with acetone prior to further processing and dried with compressed air. Immediately thereafter it was placed in a tank which had been filled up to three-quarters of its volume with monomeric triethylene glycol dimethacrylate until the product was completely covered by the monomeric liquid. The tank was then closed and a vacuum of 2 mm. Hg was applied for 5 minutes. The vacuum had the effect that the air which was present in the pores of the metal was sucked off through the monomeric liquid which in this phase only functioned as a transfer agent. At the same time this treatment resulted also in a degassing of the monomer.

After completion of the vacuum phase the vacuum was broken by introducing nitrogen at a pressure of 8 atm. and the article was then left for another 5 minutes in the sealing liquid. At this point the impregnation occurred.

After lowering of the pressure and opening of the tank the part was removed and permitted to drip dry. The impregnating resin at this stage dripped off easily because of its low viscosity.

The article was then placed in a conventional washing liquid and subjected to mechanical movement for 5 minutes. After further drip drying the part was then dried with compressed air and placed into a curing chamber. The curing there was effected within 1 hour at a temperature between 50 and 180° C.

Example 2

A cast aluminum part after cleansing was placed into a vacuum tank and after closing of the latter a vacuum of 1 mm. Hg was applied. Monomeric triethyleneglycol-dimethacrylate was introduced into the tank for a period of 5 minutes until the part was completely covered with the impregnating liquid.

The vacuum was then interrupted with nitrogen at a pressure of 8 atm. The part was left for another 5 minutes in the impregnating liquid. During this phase the impregnation of the part with the liquid occurred. The further processing was as in Example 1.

Example 3

A cast magnesium part after cleansing was placed in a vacuum tank together with monomeric butanedioldimethacrylate. After closing the tank a vacuum of 10 mm. Hg was applied which after 15 minutes was broken by means of nitrogen at a pressure of 8 atm. After completion of the impregnation during a period of 15 minutes the metal part which was covered with the monomeric butanedioldimethacrylate was again subjected to a vacuum of 10 mm. Hg for a period of 15 minutes and the vacuum was then again interrupted by means of nitrogen at a pressure of 8 atm. The cycle was then repeated for a third time. The further treatment was described in Example 1.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a process for the impregnation and impermeabilizing of cast metal articles wherein the article is impregnated by introducing a polymerizable compound into the pores of the metal surface while applying pressure or a vacuum or, successively, both, whereupon the polymerizable compound is cured within the pores of the metal,
   the improvement comprising applying to the metal a polymerizable liquid monomeric ester of methacrylic acid or acrylic acid or a mixture of both with at least one polyhydric alcohol and then curing the polymerizable ester in the absence of a polymerization catalyst.

2. The process of claim 1 wherein the polymerizable ester is triethyleneglycoldimethacrylate.

3. The process of claim 1 wherein the ester employed contains a polymerization inhibitor dissolved therein in an amount effective to improve the storage properties of the product.

References Cited

UNITED STATES PATENTS

| | | | |
|---|---|---|---|
| 2,376,706 | 5/1945 | Lum | 117—49 |
| 2,097,263 | 10/1937 | Strain | 260—89.5 A |
| 2,143,941 | 1/1939 | Crawford | 260—89.5 A |

ALFRED L. LEAVITT, Primary Examiner

J. A. BELL, Assistant Examiner

U.S. Cl. X.R.

117—119, 132 B